US011421800B2

(12) United States Patent
Kobayashi et al.

(10) Patent No.: US 11,421,800 B2
(45) Date of Patent: Aug. 23, 2022

(54) FLOW RATE REGULATING VALVE AND FLUID CONTROL APPARATUS USING THE SAME (71) Applicant: FUJIKIN INCORPORATED, Osaka (JP)

(72) Inventors: Keigo Kobayashi, Osaka (JP);
Masakazu Nagao, Osaka (JP);
Tadayuki Yakushijin, Osaka (JP);
Ryousuke Dohi, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 154 days.

(21) Appl. No.: 16/606,342

(22) PCT Filed: Apr. 24, 2018

(86) PCT No.: PCT/JP2018/016552
§ 371 (c)(1),
(2) Date: Oct. 18, 2019

(87) PCT Pub. No.: WO2018/199064
PCT Pub. Date: Jan. 11, 2018

(65) Prior Publication Data
US 2020/0124064 A1 Apr. 23, 2020

(30) Foreign Application Priority Data
Apr. 28, 2017 (JP) .............................. JP2017-089828

(51) Int. Cl.
F16K 37/00 (2006.01)
F16K 1/42 (2006.01)
(52) U.S. Cl.
CPC ............ F16K 37/0041 (2013.01); F16K 1/42 (2013.01); F16K 37/0083 (2013.01); F15B 2211/6656 (2013.01)

(58) Field of Classification Search
CPC ............................. F16K 37/0041; F16K 1/42
See application file for complete search history.

(56) References Cited

U.S. PATENT DOCUMENTS

| 6,782,344 B2 * | 8/2004 | Ito ..................... G01M 13/02 702/100 |
| 8,408,518 B2 * | 4/2013 | Schade ................. F16K 31/53 251/129.12 |

(Continued)

FOREIGN PATENT DOCUMENTS

| CN | 103107767 A | 5/2013 |
| JP | H02-78878 U | 6/1990 |

(Continued)

OTHER PUBLICATIONS

International Search Report dated Aug. 7, 2018, issued for PCT/JP2018/016552.

(Continued)

Primary Examiner — Eric Keasel
(74) Attorney, Agent, or Firm — Locke Lord LLP (57) ABSTRACT To provide a flow rate regulating valve capable of detecting a state where a flow path is fully closed even when there is no lead wire or the like for detecting the state where the flow path is fully closed. A flow rate regulating valve is a fluid regulating valve including a valve body for opening and closing fluid flow paths provided in a body and includes an actuator unit for moving the valve body, and the actuator unit includes a drive motor, a slider moved by a rotation of the motor, a cylindrical body mounted on the slider, and a shaft interlocked with the cylindrical body and provided with the valve body fixed to a distal end thereof. The motor is a stepping servomotor, and has a pressing control function for moving the valve body in the closing direction at a continuous rated torque.

4 Claims, 6 Drawing Sheets (56) References Cited

U.S. PATENT DOCUMENTS

2013/0090761 A1    4/2013  Sejimo et al.
2019/0316703 A1   10/2019  Dohi et al.

FOREIGN PATENT DOCUMENTS

| JP | H07-58444 B2 | 6/1995 |
|----|--------------|--------|
| JP | 2001-208230 A | 8/2001 |
| JP | 2002-168361 A | 6/2002 |
| JP | 2012-176783 A | 9/2012 |
| JP | 2017-194142 A | 10/2017 |
| WO | 2018/079586 A1 | 5/2018 |

OTHER PUBLICATIONS

Official Letter dated Sep. 3, 2020, issued in the corresponding CN patent application No. 201880028111.X together with its machine-generated English translation and the Search Report.

\* cited by examiner

FLOW RATE REGULATING VALVE AND FLUID CONTROL APPARATUS USING THE SAME

TECHNICAL FIELD

The present invention relates to a flow rate regulating valve and a fluid control apparatus using the same.

BACKGROUND ART

The invention described in Patent Literature 1 is a fluid pressure automatic regulating apparatus provided with a plug body and an actuator for urging the plug body.

Figure 5A:
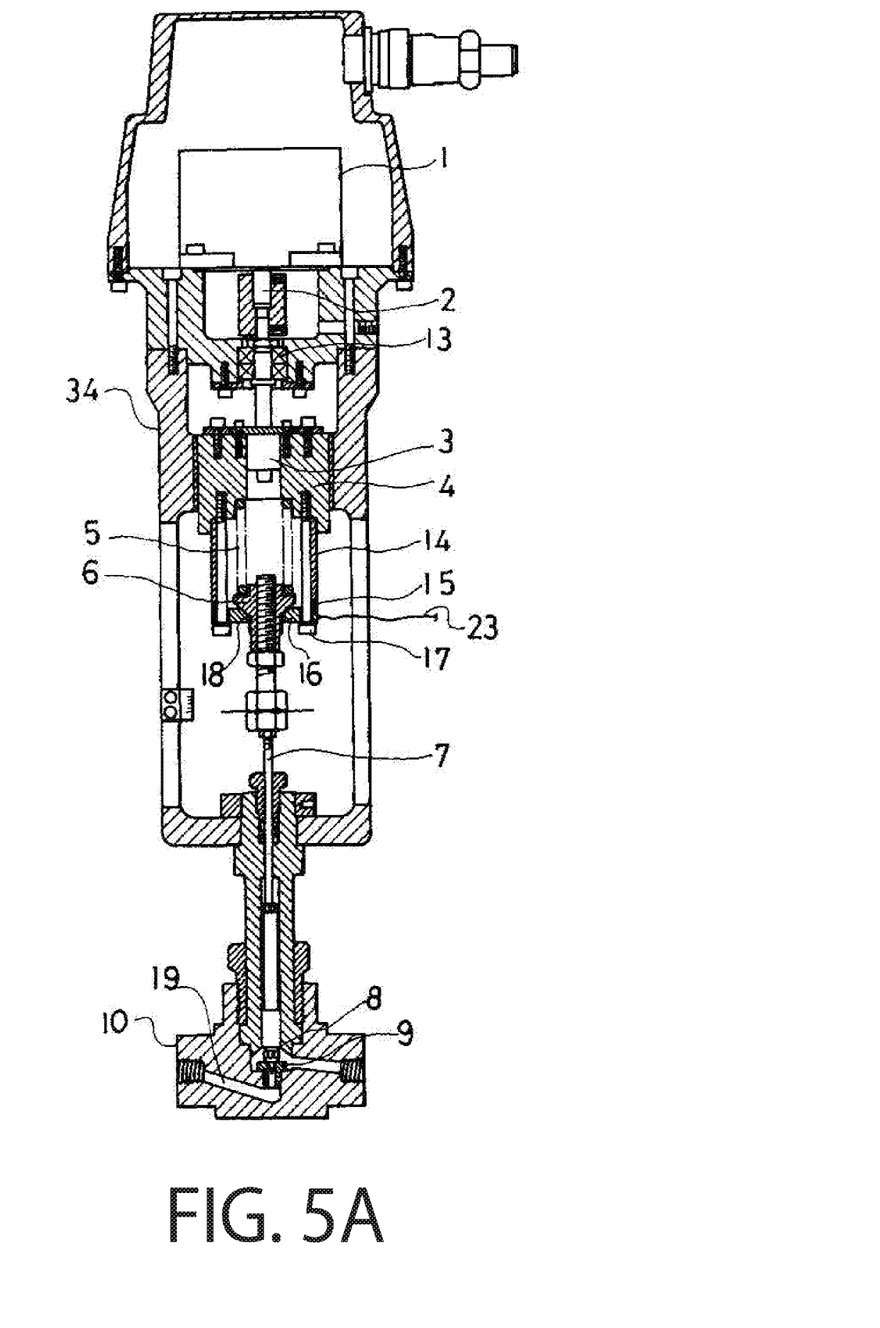
FIG. 5A corresponds to FIG. 1 in Patent Literature 1, and FIG. 5B corresponds to FIG. 2 in Patent Literature 1.

The invention of Patent literature 1 is intended to solve problems such that too much works are required for re-adjustment and maintenance of the apparatus according to an abrasion amount of a plug body 8 and a plug seat 9 in a fully closed operation detecting mechanism of an automatic electric flow rate pressure regulating apparatus of the Patent Literature 1 as illustrated in FIG. 5, and that leakage of fluid may occur easily when fully closed due to lowering of the control accuracy. The invention disclosed in the Patent Literature 1 provides an automatic flow rate pressure regulating apparatus capable of accurately detecting a fully-closed operating state without requiring readjustment of control setting values or the like every time even when wear of the plug body 8 or the plug seat 9 is advanced, and preventing damage of a shaft 7, the plug body 8, the plug seat 9, and the like due to leakage of fluid or excessive depression of the plug body 8 when fully closed.

In order to solve this problem, as shown in FIG. 1 (FIG. 5A in this application) and FIG. 2 (FIG. 5B in this application) of the Patent Literature 1, the invention described in the Patent Literature 1 solves the problem by the following operation mechanism.

Figure 5B:
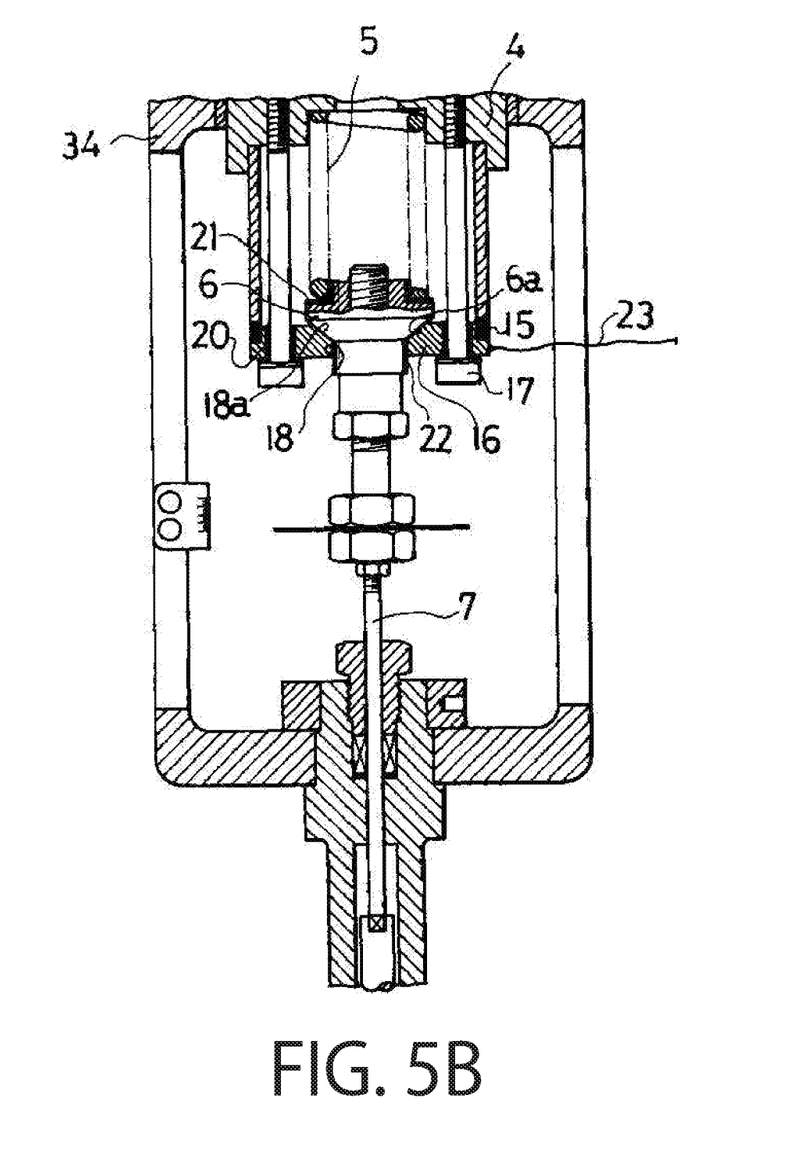

First, by turning a motor 1, a slider 4 is moved downward via a ball screw 3, and a shaft presser 6 is also lowered in a state if being pressed downward by a constant pressing force of a spring 5. Then, when the plug body 8 at a distal end of the shaft 7 comes into abutment with the plug seat 9, lowering movement of the shaft presser 6 stops. However, since the slider 4 is lowered continuously, a contact between a stopper 16 and the shaft presser 6 (or a contact between the shaft presser 6 and a contact strip 24) is disconnected, so that electric constants of control current or a control circuit change. Then, a drive control circuit of a motor is operated by the change in the control current and the electric constant, the motor is stopped, and a fluid flow path is maintained in a closed state.

Therefore, the invention described in the Patent Literature 1 has a basic configuration in which a contact between the inner peripheral surface 18a of an insertion path for the stopper 16 and a locking surface 6a of the shaft presser 6 is used as a detection contact when the flow path is fully closed to stop the drive motor 1 when the contact is opened.

CITATION LISTS

Patent Literature

Patent Literature 1: JP-B-7-058444

SUMMARY OF INVENTION

Technical Problem

In the invention described in Patent Literature 1, in order to detect the state where the flow path is fully closed, an insulating ring cylindrical body 15, insulating films 20, 21, 22, a lead wire 23 and a detector for capturing changes in electric constants of the control current and the control circuit must be separately prepared, which results in a cost increase. Also, there is a need for a power supply for supplying power to the detector, wires for transmitting power from the power supply to the detector, and a lead wire for extracting a detection result from the detector. Although these wires are connected to inside and outside of the valve, a space for installing the wires is required in the valve correspondingly. Further, when a plurality of the wires are attached to the valve, it is necessary to pay attention to a position or the like of wires so as not to erroneously disconnecting the wires at the time of installation or inspection of the valve, for example, and therefore, handling is troublesome.

It is an object of the present invention to provide a flow rate regulating valve capable of detecting a state where a flow path is fully closed even if there are no component such as lead wires required in the invention disclosed in Patent Literature 1 for detecting the state where the flow path is fully closed.

Solution to Problem

The present invention (1) provides a flow rate regulating valve including a valve body for opening and closing a fluid flow path formed in a body and an actuator unit for moving the valve body, in which the actuator unit includes: a drive motor; a slider moved by a rotation of the motor; a cylindrical body attached to the slider; and a shaft interlocked with the cylindrical body and fixed to the valve body at a distal end thereof, and in which the motor is a stepping servomotor, and has a pressing control function for moving the valve body in a closing direction at a continuous rated torque or below until a torque value becomes equal to or higher than a set value by a closed loop caused by a signal of the encoder, and detection of the closed position is performed by the pressing control function.

The stepping servomotor is a stepping motor equipped with an encoder, capable of performing closed loop control including rotating a rotary shaft of the motor at every certain angle by switching a current to be passed through a motor coil according to a pulse signal transmitted from a controller, feeding back a current position and speed from the encoder, and correcting an error from an operation command pulse.

Therefore, since the present invention (1) employs the stepping servomotor as a motor and has the pressing control function for moving the valve body in a direction of an opening 0% (closed position) at a continuous rated torque or below until the torque value becomes equal to or higher than a set value by the closed loop based on the signal of the encoder, detection of the closed position is achieved by the pressing control function, so that the insulating ring cylindrical body 15, the insulating films 20, 21, 22, the lead wire 23, and the detector for capturing changes in control current or an electric constant of the control circuit, which are required in the Patent Literature 1, is no longer necessary.

The present invention (2) is the flow rate regulating valve according to the present invention (1), in which the slider and the cylindrical body are unitized. By unitizing the slider and the cylindrical body, the number of parts can be reduced.

The present invention (3) is the flow rate regulating valve according to the present invention (1) or (2), in which the motor further has a position control function for controlling the position by the closed loop based on the signal of the encoder, and a speed control function for controlling the rotating speed of the motor rotary shaft, and setting of the predetermined opening is performed by the position control function and the speed control function.

The present invention (4) is the flow rate regulating valve according to any one of the present inventions (1) to (3), wherein torque abnormality is determined by the torque control function when the motor is detected at the closed position and when the predetermined opening is set.

Preferably, the motor has four functions of: position control for controlling the position by the closed loop based on the signal of the encoder; speed control for controlling the rotating speed of the motor rotary shaft; pressing control for moving the valve body toward the closed position at a continuous rated torque or below until the torque value reaches a set value or higher; and torque control for controlling the torque, the detection of the closed position is performed by the pressing control function, setting of the predetermined opening is performed by the position control function and the speed control function, and when the closed position is detected and the predetermined opening is set, the torque abnormality is determined by the torque control function.

According to the torque control function, the torque abnormality is detected and alarm is issued before the flow rate regulating valve is completely failed and becomes inoperable, whereby maintenance can be performed in advance, the flow rate regulating valve can be prevented from being suddenly damaged during the process, and the process can be prevented from being seriously damaged. In this way, it is possible to prevent damage to the flow rate regulating valve due to possible overload in advance, which may be caused by converting a manually operated device into an electrically operated configuration.

The present invention (5) is a fluid control apparatus including a plurality of lines each having a flow rate regulating valve, the opening of which is set to a prescribed value, in which each of the flow rate regulating valves of the plurality of lines is the flow rate regulating valve according to any one of the present inventions (1) to (4), and the amount of operation of the motor of each of the flow rate regulating valves is monitored by a monitoring apparatus connected by a communication device.

According to this fluid control apparatus, the opening of the flow rate regulating valve in which the opening is set manually in the related art can be set by using the motor, and openings of all the flow rate regulating valves can be monitored by the monitoring apparatus, so that enhancement of the flow rate controlling function of the fluid control apparatus is achieved.

As the monitoring apparatus, a personal computer, a tablet, a smartphone, or the like may be used. The communication device may be wireless or wired, and the Internet may also be used.

In addition to torque (rotation, electric current, voltage), measuring instruments for transmitting signals such as an image (moving image), temperature, humidity, acceleration (vibration), sound and the like may be appropriately added to the flow rate regulating valve to make it possible to confirm whether or not the operation is actually performed after the operation instruction is issued from the monitoring apparatus. As the measuring instrument, a MEMS sensor, a compact CCD camera, or the like can also be used as well as various measuring instruments. Further, by providing the monitoring apparatus and the measuring apparatus with the controlling function, regulation to a target flow rate may be automatically performed.

Advantageous Effects of Invention

According to the flow rate regulating valve of the present invention, there is provided a flow rate regulating valve capable of detecting a state where a flow path is fully closed even if there are no component, wire or the like required in the invention disclosed in the Patent Literature 1 for detecting the state where the flow path is fully closed.

DESCRIPTION OF EMBODIMENT

Referring to the drawings, a preferred example of the present invention will be described below in detail. However, dimensions, materials, shapes, relative arrangement and the like, and various manufacturing conditions of the components described in this example are not intended to limit the scope of the present invention unless otherwise specified, and are merely illustrative. In addition, although the directions of members and the like may sometimes be referred to as upper, lower, left and right depending of the directions in the drawings for the sake of convenience, they are not intended to limit the direction of members and the like when embodying or using in the present invention.

Figure 1:
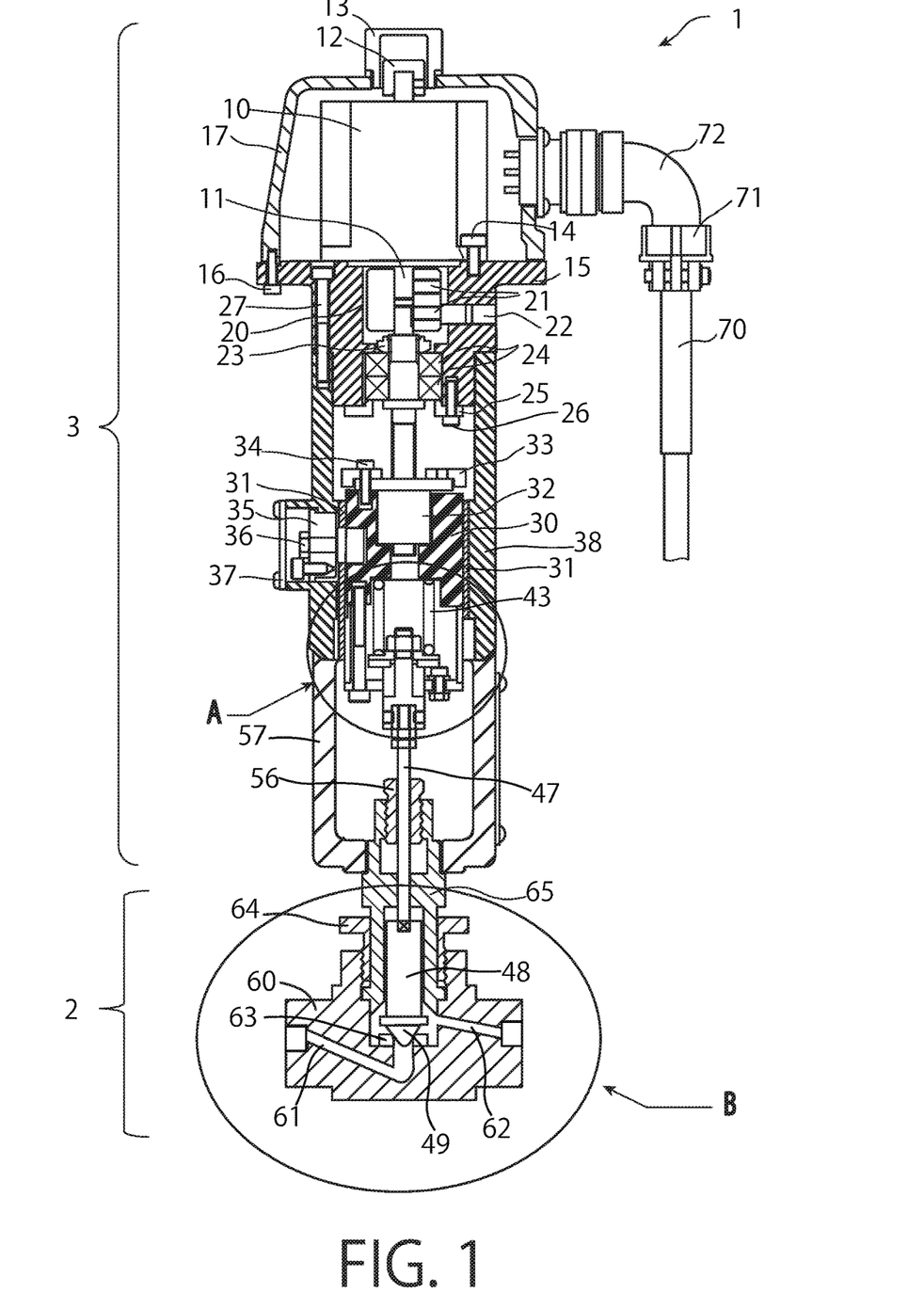
FIG. 1 is a vertical cross-sectional view illustrating an embodiment of a flow rate regulating valve of the present invention.
Figure 2:
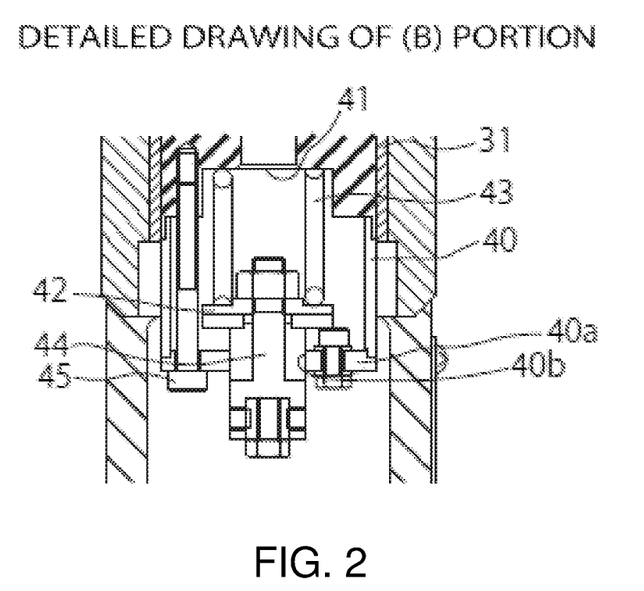
FIG. 2 is an enlarged view of a portion A of FIG. 1.
Figure 3:
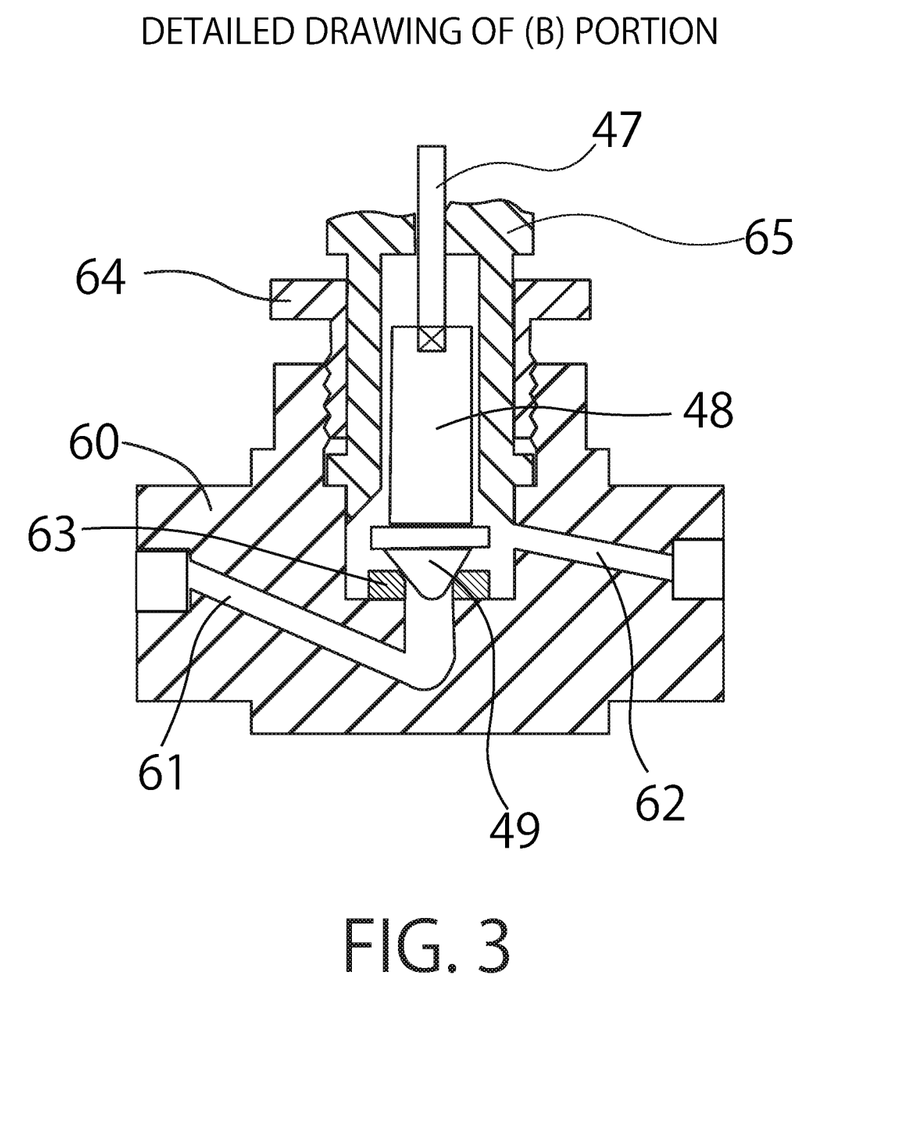
FIG. 3 is an enlarged view of a portion B of FIG. 1.

As shown in FIG. 1 to FIG. 3, a flow rate regulating valve (1) according to the present invention is a flow rate regulating valve (1) including a body (60) provided with a fluid flow paths (61) and (62), a valve unit (2) having a valve body (49) for opening and closing the fluid flow path (61) and (62), and an actuator unit (3) for moving the valve body, the actuator unit (3) includes a drive motor (10); a slider (30) moved by a rotation of the motor rotary shaft (11); a cylindrical body (40) having a bottom and projecting downward from the slider (30), a shaft (47) interlocked with the cylindrical body (40) and fixed at a distal end thereof to the valve body (49), and a spring (43) which is disposed between an upper surface of a bottom plate (40a) of the cylindrical body (40) and a lower surface of the slider (30) to urge the valve body (49) toward a closed position. The motor (10) is a stepping servomotor, and has a pressing control function for moving the valve body toward the closed position at a continuous rated torque or below until a torque value becomes equal to or higher than a set value by a closed loop based on a signal of an encoder, and detection of the closed position is performed by means of the pressing control function.

The motor (10) is fixed to the motor base (15) provided on an upper part of the flow rate regulating valve (1) by a bolt (14), the motor (10) is covered by a motor cover (17), and the motor cover (17) is fixed to the motor base (15) by means of a bolt (16).

A handle (12) fixed to a motor rotary shaft (11) is mounted on an upper part of the motor (10), and the handle (12) is covered with a handle cover (13). The handle (12) is used for opening and closing operation without energization in the maintenance operation. Depending on a structure of the motor and the valve, there may be no handle (12) and no handle cover (13).

A cable (70) for controlling the motor (10) is attached to a right side surface of the motor cover (17) via a cable plug (71) and an angle plug (72).

The motor rotary shaft (11) and a coupling (20) are fixed by a stop screw (21), and the motor base (15) and the coupling (20) can be fixed by means of a setscrew (22). The setscrew (22) is provided to prevent foreign matters such as moisture and dust from entering into the interior.

A bearing retainer (25) is attached to a lower surface of the motor base (15) by a bolt (26), and a lower surface of a bearing (24) for rotation of the motor rotary shaft (11) is in contact with the bearing retainer (25) and an upper surface thereof is fixed by a nut (23).

A ball screw (32) is provided on a lower part of the motor base (15) on an extension of the motor rotary shaft (11), and rotary movement of the motor rotary shaft (11) is converted into axial movement by the ball screw (32).

A stop ring (33) is fixed above the ball screw (32) by a bolt (34), and upward movement of the slider (30) is restricted by the stop ring (33).

A cylindrical upper cover (38) covering the slider (30) is fixed to the lower part of the motor base (15) by a bolt (27), and a cylindrical guide (31) for guiding vertical movement of the slider (30) is provided on an inner surface of the upper cover (38).

A cylindrical body (40) projecting downward from the slider (30) and having a through-hole (40b) at a center of a bottom surface is formed, and a shaft support (44) to be inserted into the through-hole (40b) for fixing a shaft (47) having a valve body (49) at a distal end thereof is fixed to a bottom plate (40a) of the cylindrical body (40) having a bottom.

The cylindrical body (40) and the slider (30) are fixed by a bolt (45), and a spring seat (42) is provided on an upper surface of the shaft support (44). A spring (43) is provided between the spring seat (42) and a recess (41) provided on the lower surface of the slider (30), and with the presence of the spring (43), the shaft (47) does not move downward but only the slider (30) moves downward until motor torque reaches a certain value after the valve body (49) is brought into contact with a valve seat (63), that is, until the rotation of the motor (10) is stopped, so that an overload is prevented from being applied to an interface between the valve body (49) and the valve seat (63). In the case where an overload to be applied to the interface is allowed to some extent or when the overload can be prevented from applied to the interface by configuring an immediate stop is possible when the motor torque reaches a certain value, it is also possible not to provide the spring (43) and the shaft (47) or the shaft support (44) is fixed directly to the cylindrical body (40) or the slider (30).

A roller adapter (35) and a cam follower (36) are attached to a lower left side of the upper cover (38), and the roller adapter (35) and the cam follower (36) are covered by a cover (37). The roller adapter (35) and the cam follower (36) are used for preventing the rotation of the slider (30) and for accurately converting the rotation of a motor shaft to the opening and closing operation of the valve.

A valve stem (48) is connected to the distal end of the shaft (47), and the valve body (49) is formed at a front end of the valve stem (48).

The body (60) includes a fluid inflow path (61), a fluid outflow path (62) and the valve seat (49) inside, and a bonnet (65) in which the valve stem (48) fits is fixed to an upper part of the body (60) by a fixing bolt (64).

A bottomed cylindrical lower cover (57) is connected to a lower end of the upper cover (38), a through-hole to which an upper part of the bonnet (65) is fixed is formed at a center of a lower surface of the lower cover (57), and at a uppermost portion of the bonnet (65), a fixing bolt (56) having a through-hole through which the shaft (47) is inserted is screwed to a female screw formed at the uppermost portion of the bonnet (65).

Figure 4:
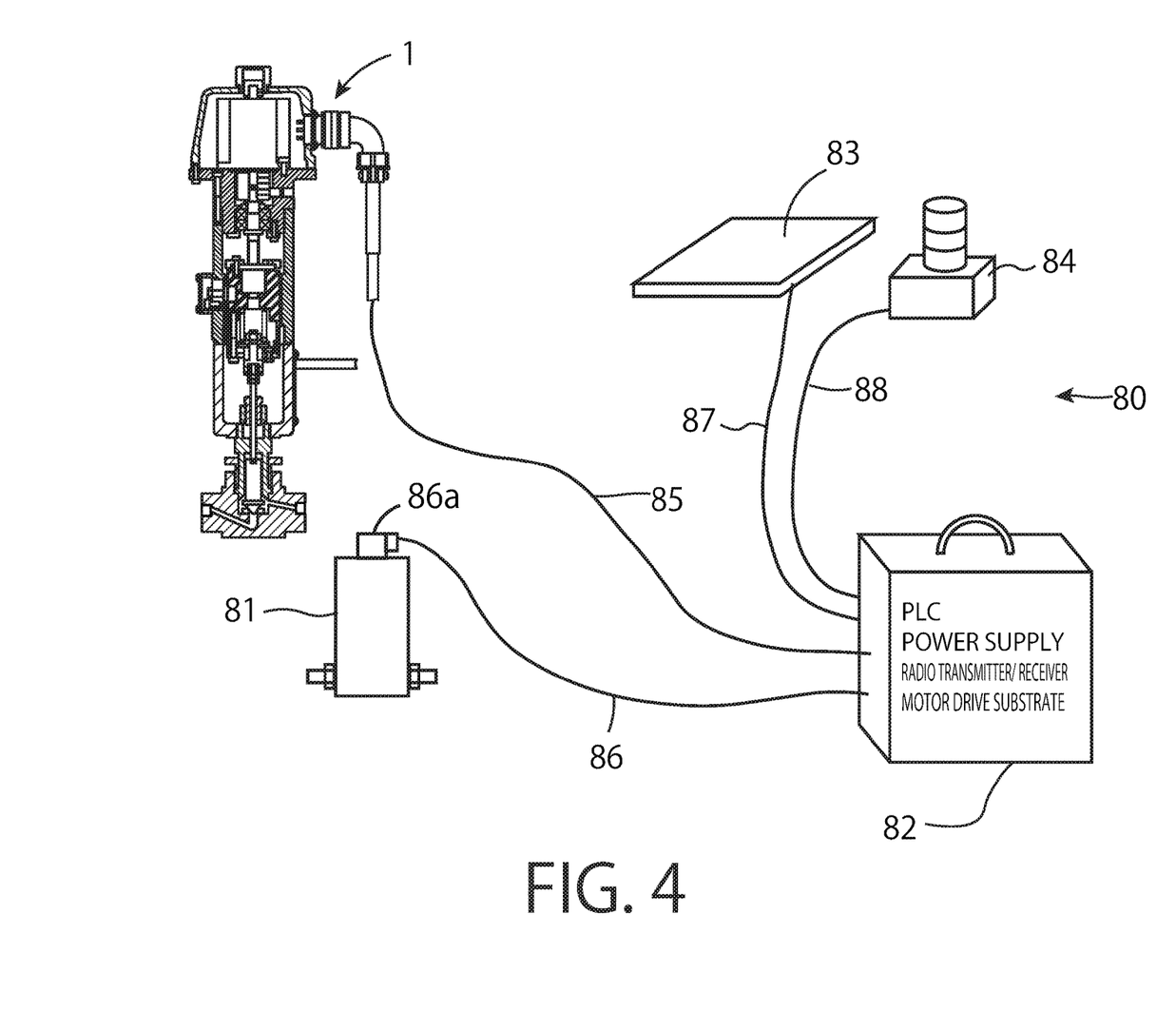
FIG. 4 is a drawing showing an example of a fluid control apparatus to which the flow rate regulating valve according to the present invention is applied.

FIG. 4 shows an example of a fluid control apparatus (80) equipped with the flow rate regulating valve (1).

The fluid control apparatus (80) includes the flow rate regulating valve (1) and a mass flow meter (81) provided on an upstream side thereof for eight lines, and supplies a fluid having a predetermined flow rate to a semiconductor manufacturing apparatus such as an epitaxial apparatus disposed on a downstream side of the fluid control apparatus (80) via each of the flow rate regulating valves (1).

The fluid control apparatus (80) further includes a control box (82) connected to eight lines of the flow rate regulating valve (1) and the mass flow meter (81), a personal computer (monitoring apparatus) (83), and a PATLITE (registered trademark) (84) serving as an alarm output device.

The control box (82) houses a Programmable Logic controller (PLC) connected to each of the flow rate regulating valves (1) and each mass flow meter, a power supply, a radio transmitter/receiver, a motor drive substrate, and the like.

The PATLITE (registered trademark) (84) turns on a green lamp during normal operation, turns on both green and red when any of the motors (10) mounted on the each of the flow rate regulating valves (1) becomes abnormal, and turns off both green and red at the time of PLC failure and when the power is turned off.

The control box (82) and each of the flow rate regulating valves (1) are connected by eight valve cables (85) in total, the control box (82) and each of the mass flow meter (81) are connected by an MFM cable (86) with eight L-shaped connectors (86a) in total, the control box (82) and the personal computer (83) are connected by a LAN cable (87), and the control box (82) and the PATLITE (registered trademark) (84) are connected by an alarm cable (88). The length of each cable (85) (86) (87) (88) is, for example, approximately 5 m.

The personal computer (83) can perform setting of the opening and flow rate monitoring for all the flow rate regulating valves (1).

According to the fluid control apparatus (80), the opening of each of the flow rate regulating valves (1) can be managed at a time. Further, by storing data such as torque in the personal computer (83), it becomes possible to compare initial data with current data, and evaluation of a deterioration state of the flow rate regulating valve (1) is enabled. Further, it becomes possible to reuse the stored opening value or the like, thereby making it easy to set the opening.

In the above, the personal computer (83) may be replaced by an appropriate terminal (monitoring apparatus) such as a tablet or a smartphone, and the monitoring apparatus may be remotely operated from a position away from the location where the fluid control apparatus (80) is installed.

In addition to the function of measuring torque, various sensors may also be incorporated in each of the flow rate regulating valves (1). For example, by incorporating an MEMS microphone, it is possible to remotely grasp the driving operation of the flow rate regulating valve (1), and to judge the abnormality in driving of the flow rate regulating valve (1) together with the torque signal. Further, by incorporating an MEMS humidity sensor, it is possible to determine whether or not a humidity around the motor (11) is normal. Further, by incorporating an MEMS temperature sensor, it is possible to determine whether or not a temperature around the motor (11) is normal. Further, by incorporating an MEMS acceleration sensor, it is possible to determine whether or not a vibration of the motor (11) itself is normal.

REFERENCE SIGNS LIST

1: flow rate regulating valve
2: valve unit
3: actuator unit
10: motor
11: motor rotary shaft
30: slider
40: cylindrical body
40a: bottom plate
47: shaft
49: valve body
60: body
61: fluid inflow path (fluid flow path)
62: fluid outflow path (fluid flow path)
80: fluid control apparatus
83: monitoring apparatus (personal computer)

The invention claimed is:

1. A flow rate regulating valve comprising:
a valve body for opening and closing a fluid flow path provided in a body;
an actuator unit configured to move the valve body, wherein the actuator unit includes:
a drive motor;
a slider moved by a rotation of the motor;
a cylindrical body attached to the slider; and
a shaft interlocked with the cylindrical body and fixed to the valve body at a distal end thereof, and
a spring which is arranged on a lower surface of the slider and presses the shaft downward,
wherein the motor is a stepping servomotor, and can move the valve body in a closing direction at a continuous rated torque or below until a torque value becomes equal to or higher than a set value by a closed loop based on a signal of an encoder, and
a closed position of the valve body can be detected, and, wherein the slider and the cylindrical body are unitized.

2. The flow rate regulating valve according to claim 1, wherein the motor performs a detection of the closed position of the valve body and the setting of a predetermined opening degree by means of a detection of an abnormal torque value.

3. The flow rate regulating valve according to claim 1, wherein the motor can control a position of the valve body by the closed loop based on the signal of the encoder, and can control a rotating speed of a rotary shaft of the motor, and
setting of a predetermined opening is performed by control of the position of the valve body and the speed of the rotary shaft.

4. The flow rate regulating valve according to claim 3, wherein the motor performs a detection of the closed position of the valve body and the setting of the predetermined opening degree by means of a detection of an abnormal torque value.

* * * * *